United States Patent [19]

Nelson et al.

[11] Patent Number: 5,237,449
[45] Date of Patent: Aug. 17, 1993

[54] BIASED LENTICULAR SIGN SYSTEM

[75] Inventors: Jordan R. Nelson, Pennington, N.J.; Randall E. McCoy, McConnelsburg, Pa.

[73] Assignee: Nelson Optics Company, Inc., Pennington, N.J.

[21] Appl. No.: 647,549

[22] Filed: Jan. 29, 1991

[51] Int. Cl.⁵ ............................................. G02B 5/122
[52] U.S. Cl. ............................. 359/532; 359/527; 359/534; 359/542; 359/551; 359/552
[58] Field of Search ............... 359/515, 520, 529, 531, 359/532, 534, 542, 551, 552, 726, 737; 40/454, 582

[56] References Cited

U.S. PATENT DOCUMENTS

| | | | |
|---|---|---|---|
| 285,270 | 9/1883 | Jaeger | 350/109 |
| 289,326 | 6/1943 | Garbarini | 350/104 |
| 1,123,969 | 1/1915 | Wiley | 40/141 |
| 1,287,464 | 12/1918 | Scott | 350/109 |
| 1,610,423 | 1/1926 | Cawley | 359/454 |
| 1,612,804 | 1/1927 | Dorey | 359/454 |
| 1,671,086 | 5/1928 | Stimson | 362/327 |
| 1,675,431 | 7/1929 | Sharp | 362/327 |
| 1,758,977 | 5/1930 | Rolph | 350/109 |
| 1,914,819 | 6/1933 | Rolph | 88/78 |
| 1,918,087 | 7/1933 | Donley | 350/109 |
| 2,086,388 | 7/1937 | Nechin | 88/78 |
| 2,172,659 | 9/1939 | Koubek | 88/82 |
| 2,181,725 | 11/1939 | Eckel | 350/109 |
| 2,281,565 | 5/1942 | Eckel | 88/78 |
| 2,380,447 | 7/1945 | Jungersen | 88/78 |
| 2,738,706 | 3/1956 | Thompson, Jr. | 88/28.93 |

(List continued on next page.)

FOREIGN PATENT DOCUMENTS

| | | |
|---|---|---|
| 159460 | 7/1953 | Australia . |
| 2557138 | 6/1976 | Fed. Rep. of Germany . |
| 3004412 | 8/1981 | Fed. Rep. of Germany . |
| 860459 | 1/1941 | France . |
| 861406 | 9/1941 | France . |
| 328908 | 8/1935 | Italy . |
| 518963 | 3/1955 | Italy . |
| 2529 | 9/1870 | United Kingdom . |
| 294069 | 1/1928 | United Kingdom . |
| 443759 | 3/1936 | United Kingdom . |
| 693922 | 7/1953 | United Kingdom . |
| 1010329 | 11/1965 | United Kingdom . |
| 1133367 | 11/1968 | United Kingdom . |

OTHER PUBLICATIONS

Traffic Control Devices, Visibility, and Geometrics, Transportation Research Record 681, National Academy of Sciences, Washington, D.C., 1978.
Roadway Markings and Traffic Control in Work Zones, Transportation Research Record 1086, Transportation Research Board, National Research Council, 1986.

Primary Examiner—Frank Gonzalez
Attorney, Agent, or Firm—Mathews, Woodbridge & Collins

[57] ABSTRACT

A highway sign includes a reflective back surface and a biased lenticular lens front surface for reflecting light back in the direction of the original light source. The reflective back surface preferably comprises a plurality of corner cubic reflectors arranged in a regular matrix. The biased lenticular lens front surface comprises arcuate surfaces, or flat surfaces having arcuate indentations, separated by relatively flat surfaces which are substantially perpendicular to the plane of the reflective surface and which form a saw-toothed pattern when seen in profile. Printing can be applied to the lens surface to form traffic control messages or indicia. The biased lenticular front surface diffuses the oncoming light, thus providing a uniform reflective surface. The reflective surface and biased lenticular lens system can be formed from a single integrated sheet of polycarbonate plastic or similar material. The sign is relatively inexpensive to manufacture, substantially waterproof and effective in reflecting light back in the direction of an oncoming automobile.

22 Claims, 9 Drawing Sheets

U.S. PATENT DOCUMENTS

| | | | |
|---|---|---|---|
| 2,818,500 | 12/1957 | Franck | 240/106 |
| 2,951,419 | 7/1960 | Lemelson | 359/619 |
| 2,974,564 | 3/1961 | Miller | 88/24 |
| 3,003,387 | 10/1961 | Schiele | 359/454 |
| 3,057,256 | 10/1962 | Erban | 88/28.93 |
| 3,236,150 | 2/1966 | Miller | 88/28.9 |
| 3,450,459 | 7/1969 | Haggerty | 350/103 |
| 3,551,024 | 12/1970 | Priest, Jr. | 359/532 |
| 3,598,493 | 8/1971 | Fisher | 356/152 |
| 3,620,600 | 11/1971 | Lindberg | 350/167 |
| 3,654,455 | 4/1972 | Siegel | 240/93 |
| 3,716,445 | 2/1973 | Lemelson | 359/530 |
| 3,782,805 | 1/1974 | Brown | 350/129 |
| 3,799,646 | 3/1974 | Footchkar | 350/97 |
| 3,810,804 | 5/1974 | Rowland | 156/245 |
| 3,827,783 | 8/1974 | Lemelson | 359/534 |
| 3,830,682 | 8/1974 | Rowland | 161/2 |
| 3,873,184 | 5/1975 | Heenan | 350/103 |
| 3,877,785 | 4/1975 | Schaefer | 359/551 |
| 3,884,554 | 5/1975 | Lemelson | 359/576 |
| 3,905,679 | 9/1975 | Langenbach | 350/103 |
| 3,920,346 | 11/1975 | Wyckoff | 359/547 |
| 3,954,324 | 5/1976 | Arnott et al. | 350/109 |
| 3,966,301 | 1/1976 | Brown | 350/128 |
| 3,975,083 | 8/1976 | Rowland | 350/103 |
| 3,980,393 | 9/1976 | Heasley et al. | 350/103 |
| 4,012,115 | 5/1977 | Brown | 350/128 |
| 4,025,159 | 5/1977 | McGrath | 350/105 |
| 4,040,760 | 8/1977 | Wyckoff | 359/551 |
| 4,053,233 | 10/1977 | Bien et al. | 359/529 |
| 4,066,331 | 1/1978 | Lindner | 350/103 |
| 4,071,292 | 1/1978 | Ise et al. | 359/455 |
| 4,145,112 | 5/1979 | Crone et al. | 350/103 |
| 4,158,222 | 6/1979 | Cook | 362/269 |
| 4,194,809 | 3/1980 | Campagna, Jr. | 359/520 |
| 4,349,598 | 9/1982 | White | 428/161 |
| 4,420,221 | 12/1983 | Sparks | 350/167 |
| 4,507,254 | 5/1985 | Daniels et al. | 264/1.9 |
| 4,560,236 | 12/1985 | Clarke | 350/102 |
| 4,576,850 | 3/1986 | Martens | 428/156 |
| 4,618,518 | 10/1986 | Pricone et al. | 359/530 |
| 4,663,871 | 5/1987 | Young | 40/454 |
| 4,717,281 | 1/1988 | Shepherd et al. | 359/534 |
| 4,726,134 | 2/1988 | Woltman | 40/582 |
| 4,816,076 | 3/1989 | Fouke et al. | 362/309 |
| 4,903,160 | 2/1990 | Taylor et al. | 362/337 |
| 4,930,870 | 6/1990 | Beach et al. | 359/542 |
| 4,984,144 | 1/1991 | Cobb, Jr. et al. | 362/339 |
| 5,036,445 | 7/1991 | Osteen | 362/348 |
| 5,084,782 | 1/1992 | Taylor | 359/515 |
| 5,095,415 | 3/1992 | Anderson et al. | 362/329 |
| 5,117,304 | 5/1992 | Huang et al. | 359/529 |
| 5,122,902 | 6/1992 | Benson | 359/529 |

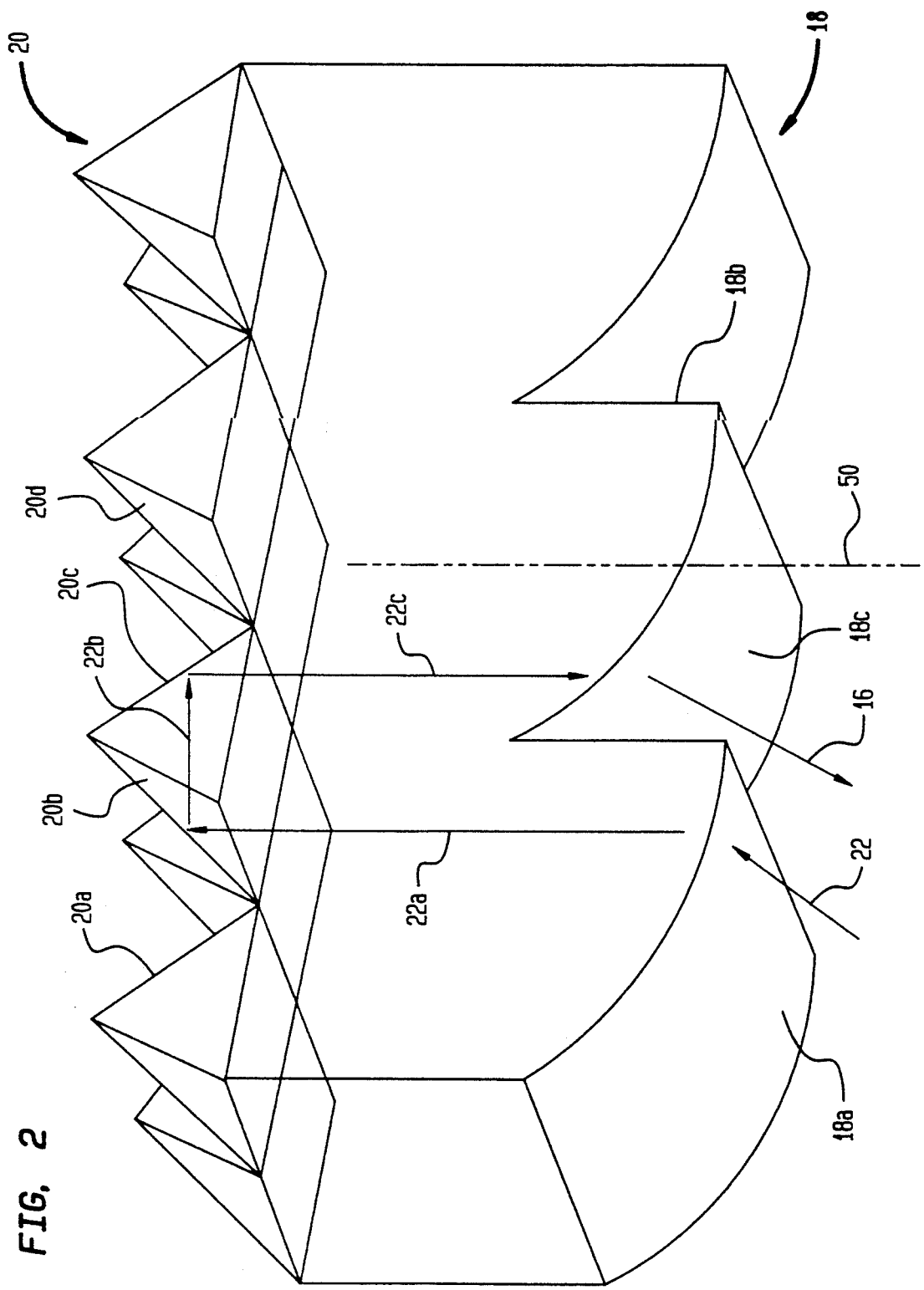

BIASED LENTICULAR SIGN SYSTEM

BACKGROUND OF THE INVENTION

Field of the Invention

The invention relates to a sign structure including a corner cubic reflector back surface and a biased lenticular lens front surface for reflecting light back in the direction of oncoming traffic.

Description of Related Art

The prior art literature discloses several efforts to deal with the problem of reading a sign from an automobile as the automobile passes by it. The difficulty is, of course, that a conventional sign is easy to read when seen from head-on but becomes progressively more difficult to read as the automobile gets closer to the sign. This is because the angle of incidence and the angle of reflection get greater as the automobile moves closer to the sign since the automobile is travelling in a direction that is parallel to, but not coincident with, the perpendicular axis of the sign. One approach employed by state highway departments to reduce the problem is to tilt the sign approximately 5° in the direction of the roadway.

Another approach is to affect the aspect of the sign. U.S. Pat. No. 4,663,871 describes a variable aspect display for use with an automobile. A lenticular lens system combined with a novel reflector provides for improved off-center viewing angles.

A similar approach is set forth in U.S. Pat. No. 4,726,134 which describes a roadway sign in which a colored retroreflective background is made from microcube corner material which consists of a green polymethyl-methacrylate film bonded to a corner cube embossed polycarbonate film.

The foregoing devices are improvements but are believed to be relatively expensive to manufacture and not as effective in reflecting light at off-center angles as the invention according to the present disclosure.

The use of carbonates in a molded flash reflector is described in U.S. Pat. No. 4,507,254.

Combinations of lenticular lens systems with special reflectors are found in other contexts such as movie or slide projection screens. For example, U.S. Pat. No. 4,012,115 discloses a projection screen having longitudinally extending ridges which have a cross-section in the shape of a quarter-cylinder, on the front of the screen, and rows of longitudinally-spaced ridge segments on the rear face of the screen.

German Patent DT 2557-138 A1 describes another front projection screen in which the front section comprises a plurality of parallel cylindrical ribs having a specified focal length and the back surface comprises another plurality of ribs with curved sides and converging edges.

Selectively reflective devices are also known in the context of highway roadway markers. These devices are typically inlaid in the road to give the driver a sense of the direction of the roadway or the middle of the highway. Typical of such retroreflective devices are those described in U.S. Pat. Nos. 3,980,393; 4,145,112 and 4,349,598.

Another approach to the sign problem is to make the sign omni-reflective so that it is highly reflective in all directions rather than selectively reflective at a specific non-symmetrical off-center angle. Typical of those devices are the inventions described in U.S. Pat. Nos. 3,873,184 and 3,975,083.

The art of producing reflectors in general is moderately well developed. The following U.S. patents are typical of the state of the reflector art: 285,270; 1,287,464; 1,675,431; 1,758,977; 1,795,071; 1,918,087; 2,181,725; 2,281,565; 2,380,447; 2,738,706; 2,818,500; 3,450,459; 3,799,646; 3,810,804; 3,830,682; 3,873,184; 3,905,679; 3,954,324; 4,066,331. For example, note U.S. Pat. No. 2,818,500 from the foregoing group which describes in FIG. 8 thereof, a prismatic reflector including a lenticular lens front section and a rear section having a corner-type reflector.

Another way to communicate with the oncoming motorist is to change the apparent color of the sign. In that regard, U.S. Pat. Nos. 3,830,682 and 4,420,221 may be relevant.

Lastly, the following U.S. patents may be of general, but not specific, relevance to the discussion: 1,758,977; 1,914,819; 2,086,388; 2,172,659; 2,974,564; 3,057,256; 3,236,150; 3,620,600; 3,782,805; 3,966,301; 4,025,159; 4,560,236; 4,576,850; French Patents 860,459 and 861,406; Australian Patent 159,460; Italian Patents 328,908 and 518,963; U.K. Patents 693,922; 1,133,367; U.S. Patent Application 289,326 published Jun. 1, 1943 by the Alien Property Custodian; German Patent DT 3004-412.

While there are numerous examples in the prior art of efforts to produce retroreflective devices, insofar as can be determined, none of the devices are relatively inexpensive to manufacture nor as effective as the invention set forth in the present disclosure.

SUMMARY OF THE INVENTION

Briefly described, the invention comprises a reflective highway sign including a corner cubic reflector back surface and a biased lenticular lens front surface for providing maximum reflection off-center. The reflectivity of the sign is maximum at 45° measured from an axis perpendicular to the front or rear surface of the sign and is substantial at around 30°. The sign is preferably formed from a single sheet of polycarbonate material which integrates the reflectors and lenses into one biased lenticular lens system. Therefore, the sign is relatively inexpensive to manufacture, waterproof and effective in reflecting light back in the direction of a vehicle as it passes by. The invention has several further advantages, including the following: the bias of the lenses has the effect of diffusing reflected light, thus limiting the degree to which the viewer is dazzled by light reflected off the sign. The combination of corner cubic reflectors and biased lenses results in a high reflectivity at large angles to the perpendicular axis of the sign. This enables the sign to be read even from a car as it approaches the sign parallel to the perpendicular axis of the sign. This in turn permits viewing of the sign for longer periods which is of great importance at high speeds.

A matrix of corner cubic reflectors is employed as part of the reflective back surface a plurality of of biased lenticular lens sections, arranged in rows, direct biased light onto the reflectors and back out in the direction from which the light came. Printing can be applied to the lens surface t form traffic control messages or indica. The same system can be sued to form numbers, letters, license plates, etc. The surface of the biased lenses is especially appropriate to be silk screen printed or hot stamped with foils.

BRIEF DESCRIPTION OF THE DRAWINGS

FIG. 2 illustrates a three dimensional view of the preferred embodiment of the biased lenticular lens system of FIG. 1, illustrating the manner in which a light beam approaching from a non-normal angle enters the sign and is reflected back substantially in the direction of the source of the light beam.

DETAILED DESCRIPTION OF THE INVENTION

During the course of this description, like numbers will be used to identify like elements according to the different views that illustrate the invention.

Figure 1A:
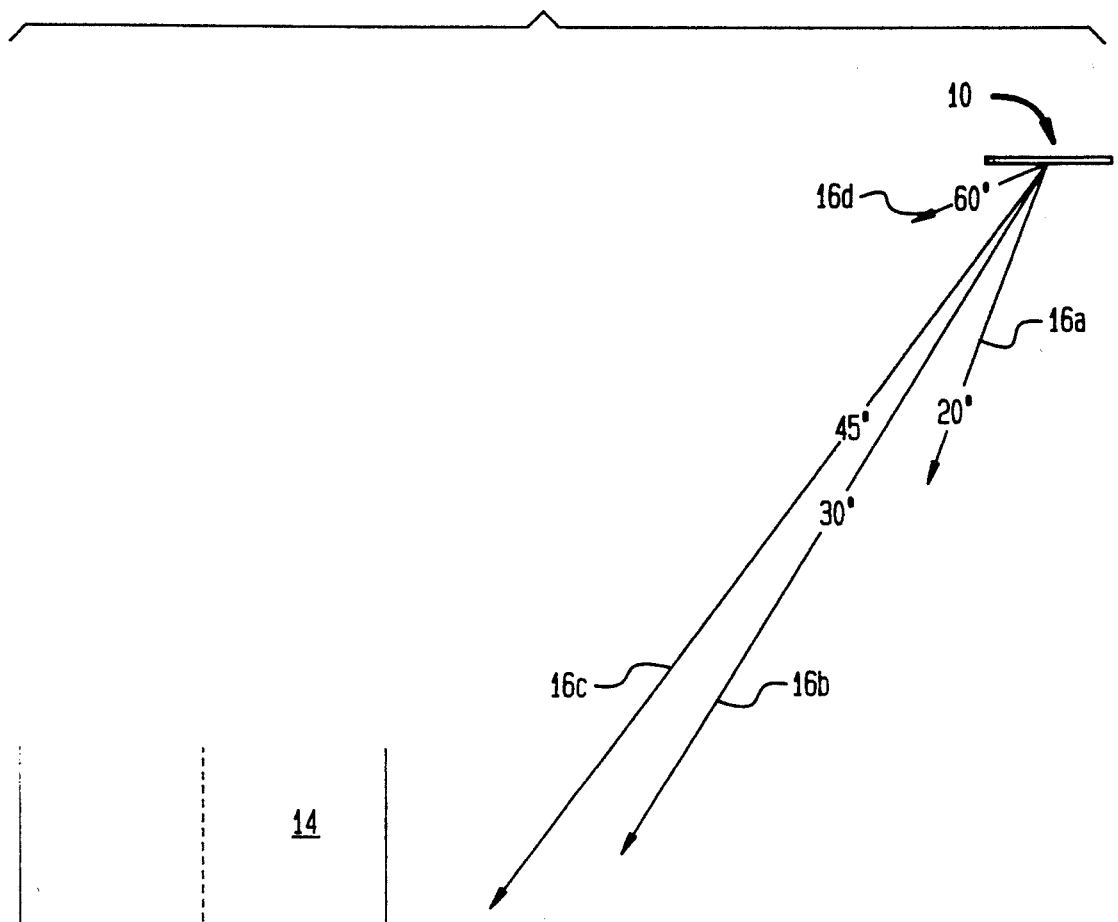
FIG. 1A illustrates a top plan view of h biased lenticular lens system employed as a sing adjacent to a highway having automobile traffic thereon.
Figure 1B:
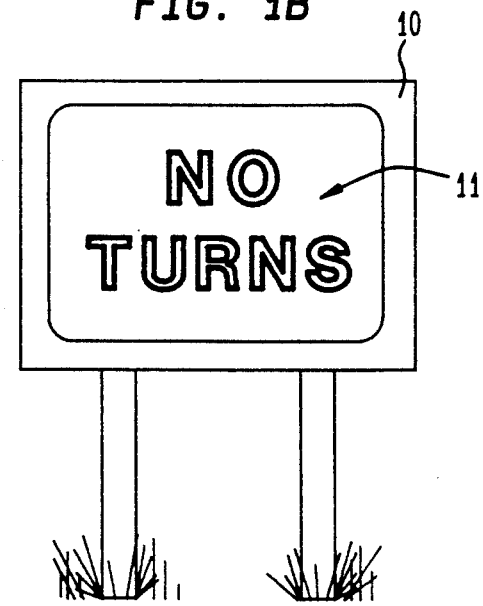
FIG. 1B illustrates a front view of the biased lenticular lens system employed as a sing with a message printed on its front surface.

A biased lenticular lens system 10 according to the preferred embodiment of the invention is illustrated in FIG. 1A. Sign 10 is located adjacent highway 14 carrying an automobile 12 or similar traffic thereon. The sign 10 may have message 11 printed on its front surface as illustrated in FIG. 1B. It is conventional on highways to tilt traffic signs, such as sign 10, at an angle of up to 5° in the direction of the highway to increase visibility. A plurality of light beams 16a, 16b, 16c and 16d are shown being reflected back in the direction of automobile 12. The length of the arrows 16a, 16b, 16c and 16d is meant to represent vectors the size of which are indicative of the relative intensity of reflected light at a given angle. From the foregoing, it is clear that the amount of light reflected by vector 16c at 45° is greater than the amount of light of vector 16b at 30 which in turn is greater than the amount of light reflected by vector 16a at 20 which also is greater than the amount of reflected by vector 16d at 60°.

Table A below indicates the relative intensity of the light at various different angles from the perpendicular axis 50 of the surface of the sign 10. The measurements were taken by placing a sign 10 flat on a rotatable table. The sign 10 was illuminated by a light source simulating the headlights of an oncoming automobile 12. The table was then rotated from 0° to 360° while readings were taken with the light source at the following less off the perpendicular axis of rotation: 20°, 30°, 45° and 60° corresponding respectively to vectors 16a, 16b, 16c and 16d. The intensity of the reflected light was measured in units of footlamberts.

It will be noted that the maximum intensity reflection was found at 45° at angles of 0° and 360° (which are the same) with relative readings of 4,773 and 4,630 respectively. The next brightest reflection angle was 30° with readings at 0° and 360° of 4,180 and 4,218. By comparison, the maximum relative reflection for 2° was 1,806 at 0°, and for 60° the reading was 663.

TABLE A

PREFERRED EMBODIMENT OF THE INVENTION 10
Intensity of Reflected Light in Foot-Lamberts

| Rotation in Degrees | 20° | 30° | 45° | 60° |
|---|---|---|---|---|
| 1 | 0 | 1806 | 4180 | 4773 | 663 |
| 2 | 45 | 1540 | 627 | 320 | 196 |
| 3 | 90 | 1407 | 701 | 417 | 328 |
| 4 | 135 | 1540 | 1220 | 627 | 497 |
| 5 | 180 | 1543 | 1482 | 544 | 310 |
| 6 | 225 | 1282 | 1230 | 626 | 444 |
| 7 | 270 | 1282 | 770 | 373 | 267 |
| 8 | 315 | 1418 | 708 | 327 | 206 |
| 9 | 360 | 1697 | 4218 | 4630 | 684 |

By way of comparison, Table B below illustrates a control test measuring the front reflective characteristics of a corner cubic reflector without a biased lenticular lens system. It will be noted that there is no angle at which significant reflection takes place.

TABLE B

CORNER CUBIC REFLECTOR CONTROL
TEST FROM FRONT
Intensity of Reflected Light in Foot-Lamberts

| Rotation in Degrees | 20° | 30° | 45° | 60° |
|---|---|---|---|---|
| 1 | 0 | 1753 | 1237 | 780 | 352 |
| 2 | 45 | 2093 | 1313 | 1287 | 242 |
| 3 | 90 | 1933 | 889 | 1377 | 270 |
| 4 | 135 | 2033 | 1033 | 1390 | 308 |
| 5 | 180 | 1443 | 445 | 343 | 156 |
| 6 | 225 | 2230 | 1056 | 1373 | 390 |
| 7 | 270 | 2340 | 1530 | 1408 | 226 |
| 8 | 315 | 1553 | 833 | 454 | 162 |
| 9 | 360 | 1917 | 1063 | 778 | 348 |

Lastly, also as a control, the reflection from the back side of the reflective surface is shown in Table C. The reflection from the back side of the sign 10 is relatively poor.

TABLE C

REVERSE SIDE OF SIGN CONTROL TEST
Intensity of Reflected Light in Foot-Lamberts

| Rotation in Degrees | 20° | 30° | 45° | 60° |
|---|---|---|---|---|
| 1 | 0 | 135 | 225 | 281 | 176 |
| 2 | 45 | 205 | 110 | 317 | 176 |
| 3 | 90 | 194 | 116 | 262 | 215 |
| 4 | 135 | 130 | 132 | 235 | 270 |
| 5 | 180 | 100 | 150 | 236 | 1230 |
| 6 | 225 | 107 | 123 | 269 | 152 |

TABLE C-continued

REVERSE SIDE OF SIGN CONTROL TEST
Intensity of Reflected Light in Foot-Lamberts

| Rotation in Degrees | 20° | 30° | 45° | 60° |
|---|---|---|---|---|
| 7 | 270 | 120 | 125 | 208 | 161 |
| 8 | 315 | 140 | 90 | 232 | 157 |
| 9 | 360 | 135 | 230 | 250 | 168 |

A three dimensional view of the preferred embodiment of the biased lenticular lens system is shown in FIG. 2. An incoming light beam 22 typically from a automobile 12 such as illustrated in FIG. 1A, contacts the arcuate portion 18a of the biased lenticular lens 18 and is focused along path 22a to a first rear wall 20b of the corner cubic reflector rear surface 20. The beam then follows path 22b to a second rear wall 20c of the rear reflector 20 which in turn reflects the beam along path 22c to another arcuate surface 18c of the front biased lenticular lens 18. Lens surface 18c in turn refracts the beam back along path 16 which is roughly parallel to the path of incoming ray 22. The intensity of the returning light beam 16 is maximum at a point between 39° and 48° from the perpendicular axis 50 of the sign. In the preferred embodiment of the invention 10, the intensity of returning light beam 16 is maximum at 45° from the perpendicular axis 50.

Figure 3:
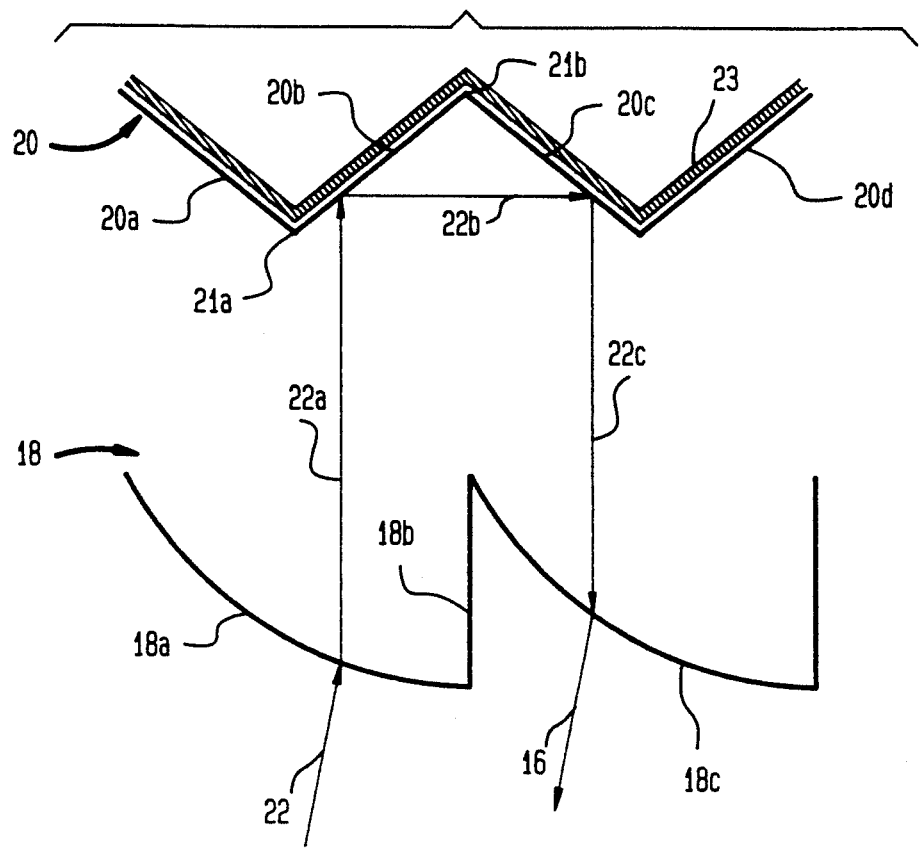
FIG. 3 is a cross-sectional view of the biased lenticular lens system of FIG. 2.

The corner cubic reflector surface 20 is shown in cross-section in FIG. 3 which also shows the path of oncoming light beam 22 as it enters and passes through the biased lenticular lens system 18. A silicone coating 23 is preferably applied to the back of corner cubic reflector rear surface 20 in order to protect the sign from the elements.

Figure 4:
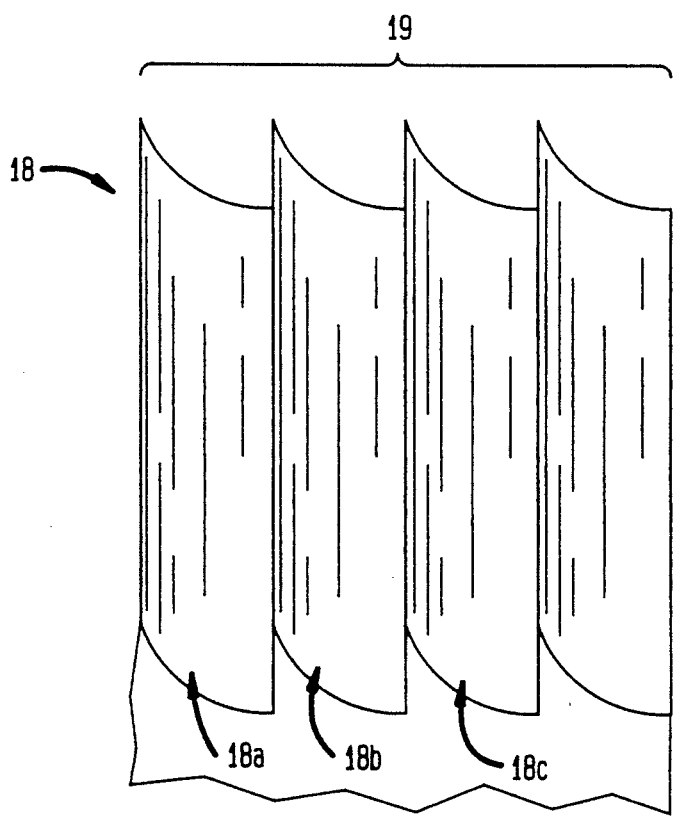
FIG. 4 is a plan view of the lens surface of the biased lenticular lens system of FIG. 2.

FIG. 4 shows the preferred embodiment of the biased lenticular lens 18 in plan view. The lens surface of biased lenticular lens 18 is made up of a plurality of rows of quarter-cylindrical lenses 19.

Figure 5:
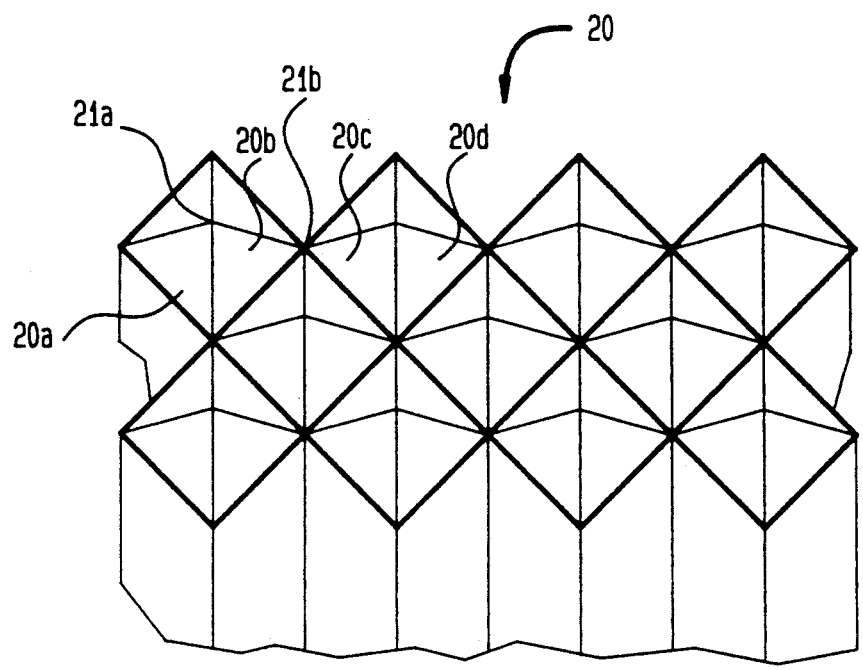
FIG. 5 is a plan view of the back of the corner cubic reflective back surface of the lenticular lens system of FIG. 2.

FIG. 5 shows the corner cubic reflector rear surface 20 of the preferred embodiment of the biased lenticular lens system 10 in plan view. The corner cubic reflector rear surface 20 is made up of a plurality of contiguous four-faced pyramids 21, each having apex 21a.

Figure 6:
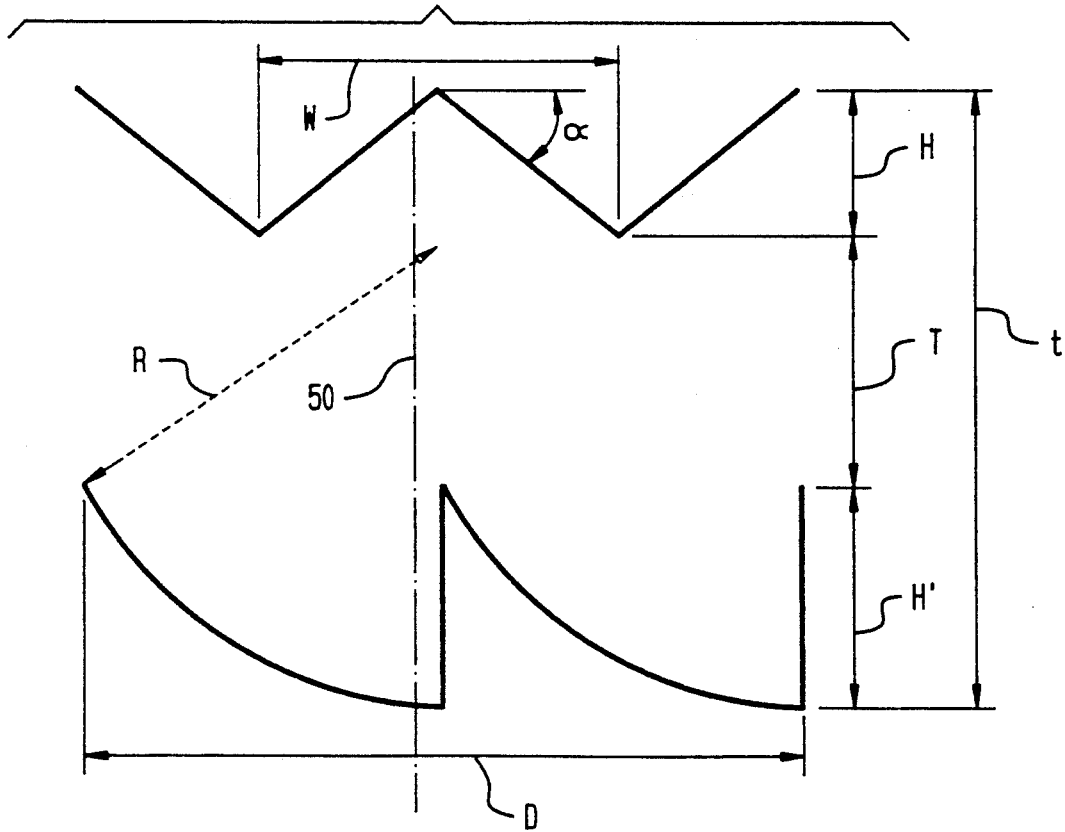
FIG. 6 is a cross-sectional view of the biased lenticular lens system illustrated in FIG. 2 indicating important dimensions and relationships.

The basic dimensions of the cross-section illustrated in FIG. 3 are shown in FIG. 6. Table D below and the accompanying assumptions illustrate biased lenticular lens system 10 in four different thicknesses, namely: 0.125 inches, 0.077 inches, 0.062 inches and 0.052 inches. The thickness of the biased lenticular lens system depends on the surface area of the sign 10 and can, in theory, be as small as 1 mil. Signs of this thickness would be fabricated by applying a film to a substrate to form the sign 10. The surface area of the sign 10 depends on the application of the sign 10. The preferred embodiment of the invention 10 is the one an integrated thickness of approximately 0.125 inches and accordingly all of the entries are set forth in the column for that embodiment. The sheet thickness (t) is determined with regard to the required rigidity of the biased lenticular lens system 10.

TABLE D

| Parameter | Description | Sheet Thickness (t) | | | |
|---|---|---|---|---|---|
| | | 0.125 in. | 0.077 in. | 0.062 in. | 0.052 in. |
| W | pyramid width | 0.050 in. | | | |
| D | lens base diameter | 0.105 in. | 0.072 in. | 0.058 in. | 0.049 in. |
| R | radius of lens curvature | 0.077 in. | 0.053 in. | 0.043 in. | 0.036 in. |
| H' | arcuate lens thickness | 0.021 in. | 0.014 in. | 0.011 in. | 0.010 in. |
| H | pyramid height | | | | |
| | assigned | 0.039 in. | | | |
| | calculated | 0.018 in. | | | |
| n | index if refraction | 1.59 | | | |
| α | pyramid angle (>39.12°) | 50.0° | | | |
| f | lens focal length | 0.131 in. | 0.090 in. | 0.073 in. | 0.061 in. |
| T | minimum sheet thickness | 0.105 in. | 0.072 in. | 0.058 in. | 0.049 in. |

| Assumption: | |
|---|---|
| (1) $n1/0 + n2/i = (n2 - n1)R$ | |
| (2) $n1 = 1, n2 = 1.59$ | |
| (3) "thin lens" Lens Maker's Equation | $1/f = (n - 1) \times (1/R1 - 1/R2)$ |
| (4) plano-convex lens | $R2 = \infty$ |
| (5) Equation reduces to | $R = f \times (n - 1)$ |
| (6) Boundary Condition | $T < f < 1.5T$ |
| so f was taken to 1.25T | $f \approx 1.25 \times T$ |
| Calculations: | |
| (1) $D = T$ | |
| (2) $R = D \times (n - 1)$ | |
| (3) based on volume of a slice of a sphere | $H' = R - \sqrt{(R \times R - 0.25 \times D \times D)}$ |
| (4) based on volume of pyramid | $H = 0.5 \times W \times \arctan \phi$ |
| (5) set variables | $D = T, W = 0.050$ in., $H = 0.039$ in. |

Figure 7:
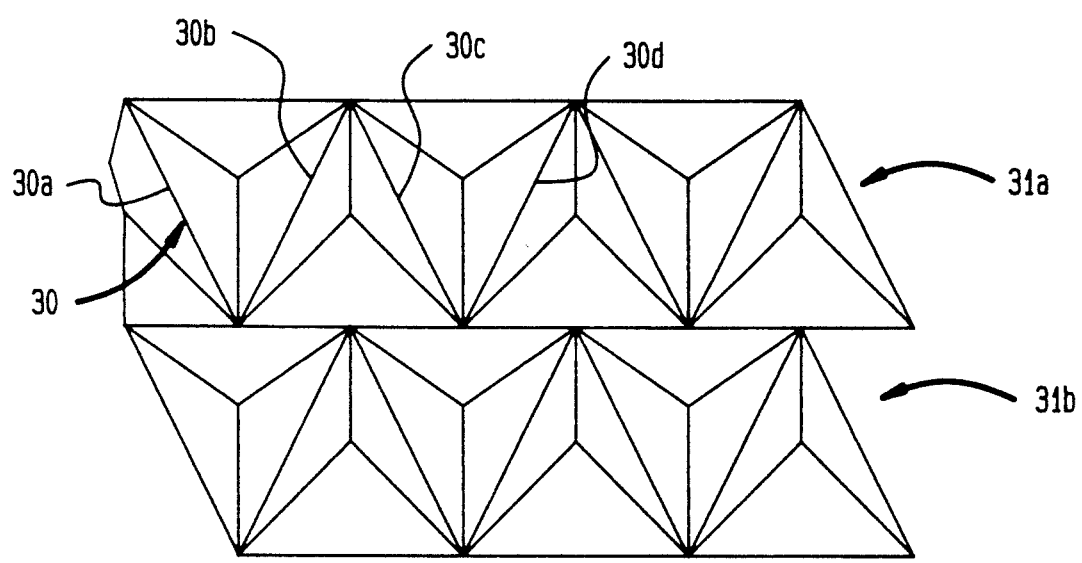
FIG. 7 is a plan view of the back of an alternative embodiment of the corner cubic reflective back surface of the biased lenticular lens system of FIG. 1, having three-faced pyramidal corner cubic reflectors.

FIG. 7 illustrates an alternative embodiment of the rear surface of the cubic corner reflector 20 made up of a plurality of three-faced pyramidal corner cubic reflectors 30, each having apex 32. The three-faced pyramids 30 are shown arranged in two rows 31a and 31b offset from each other by 90°. Surfaces 30a, 30b, 30c and 30d respectively serve the same functions as surfaces 20a, 20b, 20c and 20d of the preferred embodiment illustrated in FIG. 2.

Figure 8:
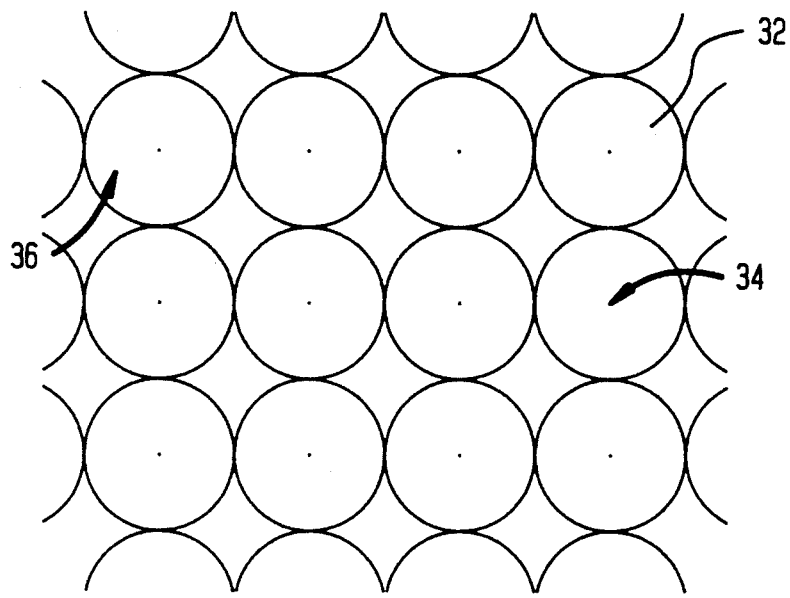
FIG. 8 is a plan view of the back of a further alternative embodiment of the corner cubic reflective back surface of the biased lenticular lens system having conical reflectors.

FIG. 8 is a plan view of an alternative embodiment of corner cubic reflective surface 20, in which the corner cubic reflective surface 20 is made up of a plurality of contiguous conical reflectors 32 each having apex 34. In this embodiment, the continuous wall 36 of each of the conical reflectors 34 serves the same purpose as surfaces 20a, 20b, 20c and 20d in FIG. 2.

Figure 9:
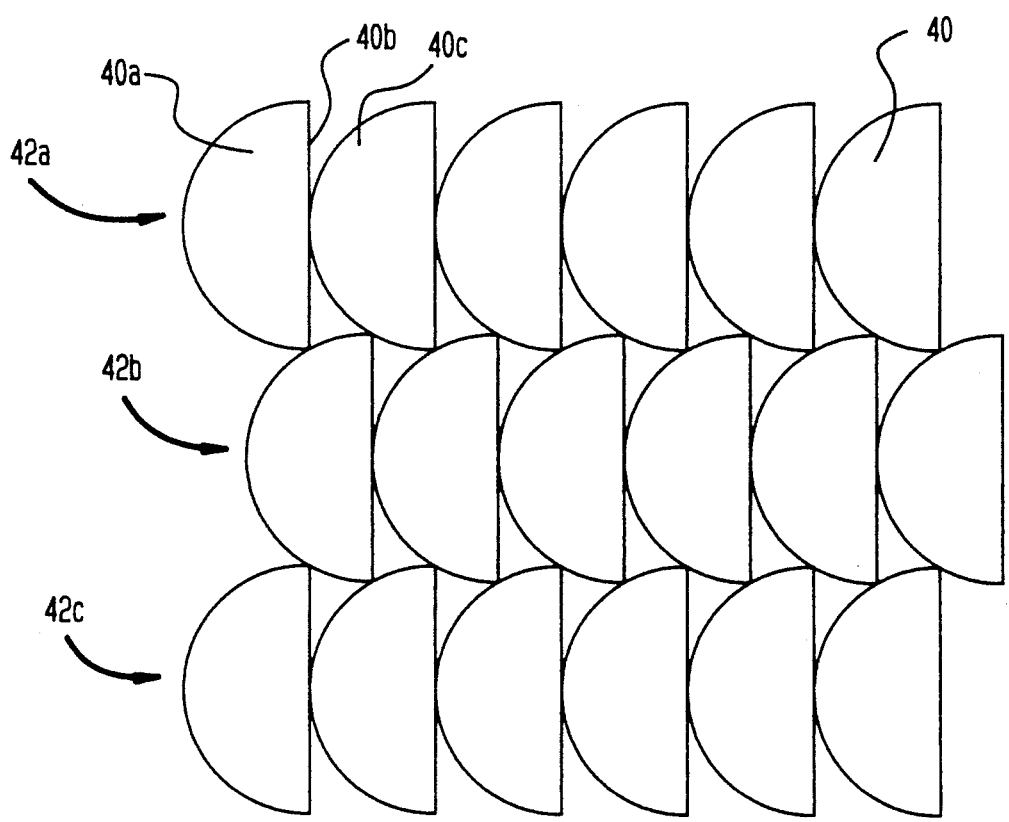
FIG. 9 is a plan view of the front of an alternative embodiment of the lens surface of the biased lenticular lens system formed by a plurality of quarter spherical lenses.

In FIG. 9, which illustrates an alternative embodiment of the biased lenticular lens 18, rows of quarter-spherical lenticular lenses 40 are arranged in staggered rows 42a, 42b, 42c, etc. The quarter-spherical lenticular lenses 40 include rounded portions 40a and flat vertical face portions 40b which correspond in side profile to saw-tooth shaped surfaces 18a, 18c and 18b, respectively, illustrated in FIG. 2.

In the preferred embodiment of the biased lenticular lens system 10, the rear reflecting elements 20 are four-faced pyramids whose base angle c exceeds the critical angle for the preferred plastic material which, in the case of polycarbonate, the preferred plastic material, is approximately 39°. The small size (i.e. high $\alpha$ angle) of the pyramids 20 and the strength of the polycarbonate plastic permit a very thin sign. The lenticular lens 18 is formed from a plurality of rows of quarter cylindrical lens sections. This permits the gathering of light at a greater angle than a flat surface and provides an opportunity to control the reflective light envelope.

Figure 10A:
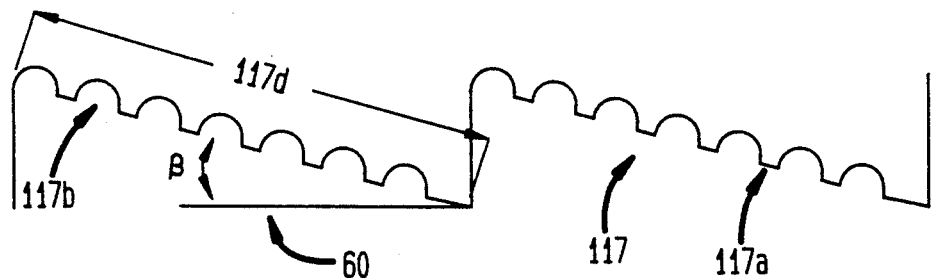
FIGS. 10A-H illustrate alternative embodiments of the lens surface of the biased lenticular lens system of FIG. 2.
Figure 10B:
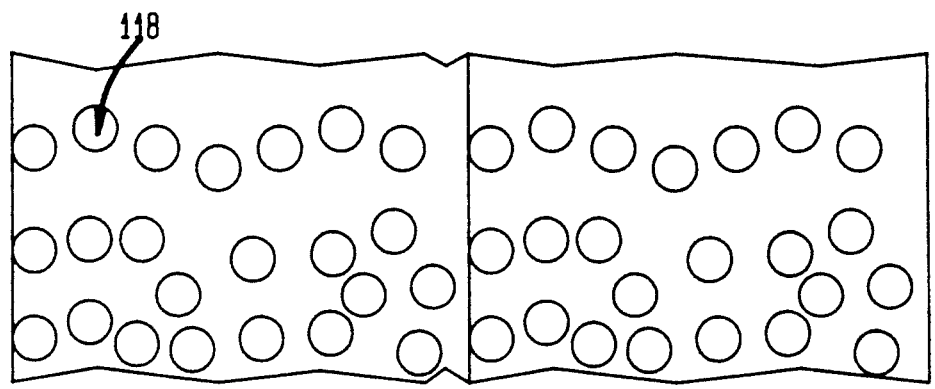
Figure 10C:
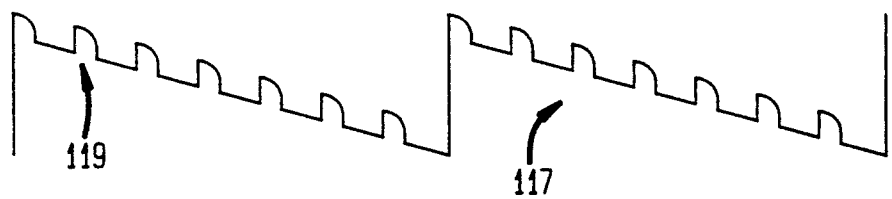
Figure 10D:
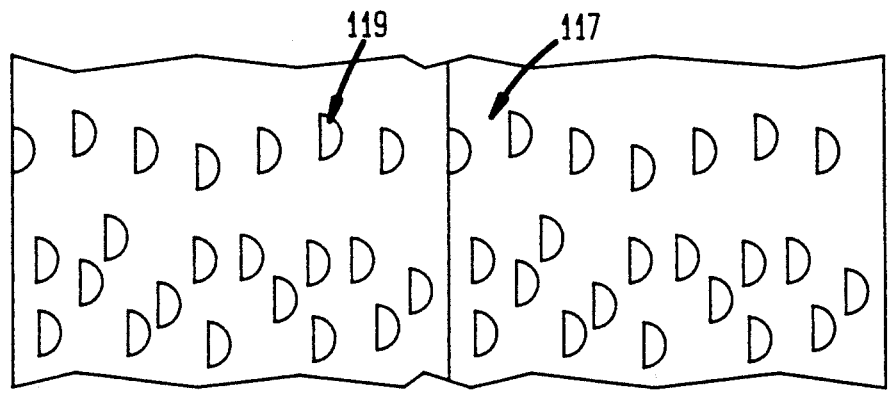
Figure 10E:
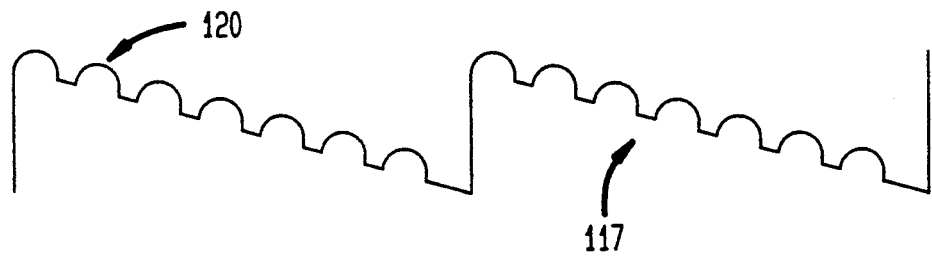
Figure 10F:
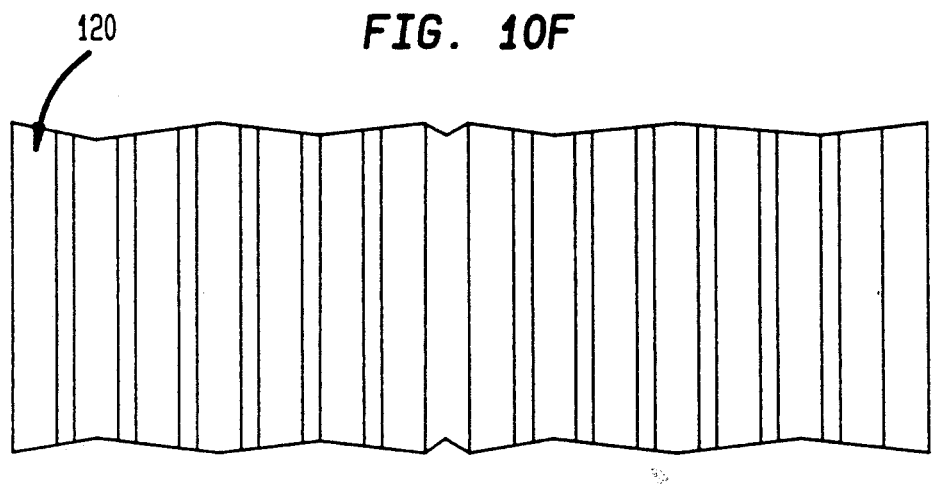
Figure 10G:
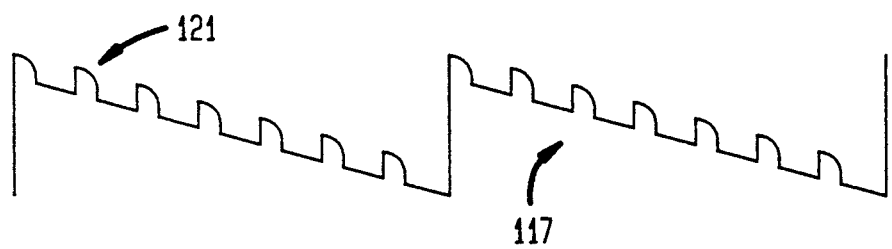
Figure 10H:
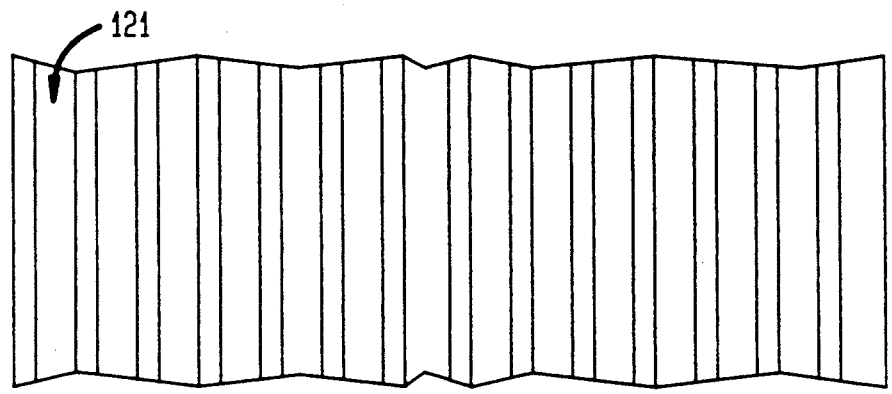

FIGS. 10A–H illustrate alternative embodiments of the lens surface 18. FIG. 10A illustrates a lens surface 117 comprising a front surface 117a having indentations 117b arranged in a pattern on the front surface 117a. The angle $\beta$ of the front surface 117a to the axis 60 may be up to 20°. For every 2° of $\beta$, the viewer envelope shifts by 1°. To facilitate molding of the sign 10, the length 117d of surface 117a must be less than the thickness of the sheet t (FIG. 6) minus the base length w of corner cubic reflectors 20 (FIG. 6). For example, if t=100 mils, w=45 mils, length 117d must be less than 55 mils. The indentations 17b may be in the form of spherical indentations 118 shown in FIG. 10A, B, quarter spherical indentations 119 shown in FIG. 10C, D, half rods 120 shown in FIG. 10E, F or quarter rods 121 shown in FIG. 10G, H.

Figure 11:
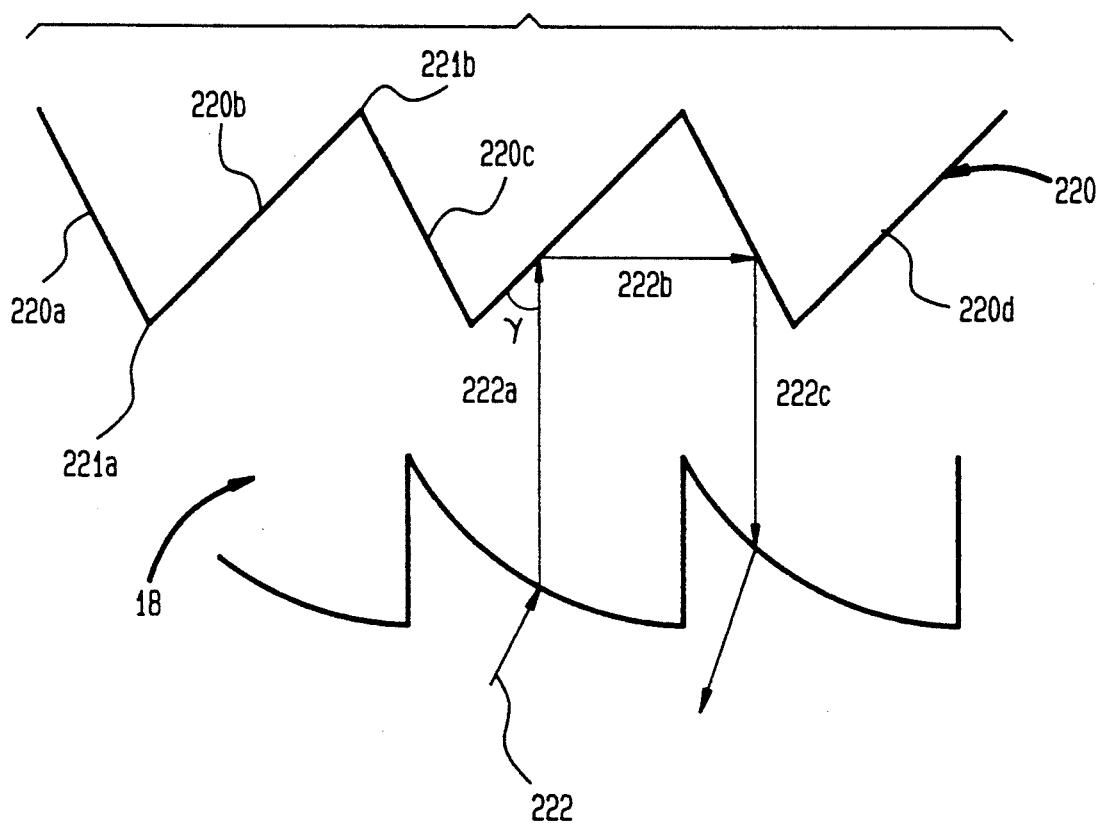
FIG. 11 illustrates an alternative embodiment of the corner cubic reflective back surface in which the corner cubic reflectors are biased.

FIG. 11 illustrates an alternative embodiment of corner cubic reflectors 20. In this embodiment, corner cubic reflectors 220 are biased at an angle such that the angle 8 between the light beam 222a and the reflecting surfaces 220 is never less than the critical angle of the material from which the sign 10 is fabricated. In the case of polycarbonate this angle is approximately 39°.

A major cost factor in producing plastic signs is the cost of constructing molds. Accordingly, it is often necessary to create a wide variety of molds, at great cost, in order to accommodate a variety of different signs. The present flat sign, however, lends itself to easy modular plastic construction. Therefore, in order to change the information on the sign, it is possible to leave the interior of the reflective sign vacant and simply snap on, glue or sonicly weld on indicia 11 which may be numbers, letters or symbols. Alternatively, signs or indicia may be printed onto sign 10 by silk screen printing or hot stamping foil onto the front surfaces 18a and 18c of lenticular lens 18 to provide information. The hot stamping of foil onto the front surfaces 18a and 18c of lenticular lens 18 has the added advantage of improving the visibility of information on the sign because the stamping process slightly flattens the parts of the surface of lenticular lens 18 which carry information, thus reducing their ability to refract light and thus increasing the contrast between the information carrying parts and the rest of lenticular lens 18. The preferred embodiment of invention 10 is especially well suited to silk screening since silk screens are typically coarser than the surface of lenticular lens 18, thus allowing the printing ink to fill the sawtooth pattern of lenticular lens 18 fully. A big sign can be produced by joining smaller sections together to form a larger overall pattern.

For greater protection, it may be desirable to add a silicone coating 23 having a very low surface energy to the back of the sign. Silicone coatings have outstanding environmental durability and a very low index of refraction. The low surface energy of silicone coatings results in a high degree of adhesion to other materials. A silicone coating 23 on the back of the plastic reflector 20 would provide protection against weathering for critical rear reflecting optical elements and its low index of refraction (e.g., 1.1 to 1.2) would not significantly adversely affect the internal critical angle previously cited (i.e. 39° for polycarbonate plastic). Polycarbonate plastic is especially suited for making road signs and is relatively unique in that it has several glass transition temperatures. Other less preferred plastics such as acrylic or polystyrene or block or copolymers of acrylic or polystyrene tend to be more brittle, not as fire-resistant and more prone to shattering. New versions of polycarbonate plastics are particularly good for outdoor use and are formed from block copolymers. The index of refraction of polycarbonate plastic is about 1.6 and is highest among commercial grade plastics. The use of polycarbonate, with its high index of refraction and high impact strength, allows shallower optical elements that are more resistant to dirt and far easier to mold. In short, the use of polycarbonate plastic provides the following major advantages:

(1) It is not brittle, flammable or weak like acrylics or polystyrene but can tolerate the engineering requirements necessary for forming a thin, large sign. Since it has more than several glass transition temperatures, it has a very high impact resistance.

(2) Polycarbonate plastic is fairly resistant to road and dirt grime which can accumulate in prior art prismatic elements. The use of silicone to treat the back helps to reduce reflection degradation.

(3) Environmental wearing of the corner cubic elements is also a consideration and polycarbonate plastic is resistant to this type of deterioration.

(4) The angle of refraction, as previously described, is relatively small, thereby making it possible to produce a thin sign.

(5) The visibility of the sign is not significantly affected by the presence of water on it due to rain, fog or mist because the refractive index of polycarbonate plastic is much higher to that of water.

The biased lenticular lens system 10 may be molded from a single plastic sheet or the patterns on the front and rear surfaces 18 and 20 may be embossed on soft plastic using pattern rollers.

According to the preferred embodiment in the invention, the following are the preferred ranges and preferred parameters for the following dimensions:

| PARAMETER | | PREFERRED RANGE | PREFERRED VALUE |
|---|---|---|---|
| W | (pyramid width) | <T | 50 mils |
| D | (lens base diameter) | 4 μm to ½T | 105 mils |
| R | (radius of lens curvature) | 2 μm to ½T | 4 mils |
| H' | (lens thickness) | 4 μm to ½T | |
| H | (pyramid height) | <T | 39 mils |
| n | (index of refraction) | 1.2–1.7 | 1.59 |
| φ | (pyramid angle >39.12°) | >39° | 45° |

-continued

| PARAMETER | PREFERRED RANGE | PREFERRED VALUE |
|---|---|---|
| f (focal length) | >¼R | 131 mils |
| T (minimum sheet thickness) | >1 mils | 125 mils |

While the invention has been described with reference to the preferred embodiment thereof, it will be appreciated by those of ordinary skill in the art that modifications may be made to the various different elements that comprise the invention without departing from the spirit and scope of the invention as a whole.

We claim:

1. A reflective sign apparatus for reflecting flight from a light source, said apparatus comprising:
   a reflective surface; and,
   a biased lenticular lens means located adjacent said reflective surface.
   said biased ventricular lens means receiving said light from said light source, focusing said received light to said reflective surface, receiving light reflected off said reflective surface and refracting said reflected light in a direction substantially parallel to the path of light from said light source.

2. The apparatus of claim 1 wherein said reflective surface comprises corner cubic reflectors.

3. The apparatus of claim 1 wherein said reflective surface comprises a plurality of pyramidal reflectors, and said pyramidal reflectors having at least four faces.

4. The apparatus of claim 1 wherein said biased lenticular lens means comprises:
   a plurality of substantially arcuate surfaces; and,
   a plurality of substantially flat surfaces,
   wherein each arcuate surface is separated from another arcuate surface by a substantially flat surface.

5. The apparatus of claim 1 wherein said reflective surface and said biased lens means are integrally formed from a single piece of optically clear plastic material.

6. The apparatus of claim 1 wherein said apparatus comprises a traffic sign and said light source comprises head lights from an automobile.

7. The apparatus of claim 1 wherein said reflective surface comprises a plurality of pyramidal reflectors and said pyramidal reflectors having at least three faces.

8. The apparatus of claim 1 wherein said reflective surface comprises a plurality of conical reflectors.

9. The apparatus of claim 2 wherein said corner cubic reflectors are biased.

10. The apparatus of claim 1 wherein said reflective surface and said biased lens means are integrally formed from a single pierce of optically clear plastic material which is selected from the group consisting of polycarbonate plastic, acrylic and styrene.

11. The apparatus of claim 1 further comprising:
    means located on the surface of said biased lenticular lens means for forming indicia on said apparatus.

12. The apparatus of claim 1 wherein said biased lenticular lens means comprises a front surface having a plurality of indentations.

13. The apparatus of claim 1 wherein the intensity of said reflected light is maximum at a point between 39° and 48° from the perpendicular axis of said sign.

14. The apparatus of claim 13 wherein the intensity of said reflected light is maximum at 45° from the perpendicular axis of said sign.

15. A reflective sign apparatus for reflecting light from a light source, said apparatus comprising:
    a reflective surface; and
    a biased lenticular lens means located adjacent said reflective surface, said biased lenticular lens means including a plurality of substantially arcuate surfaces and a plurality of substantially flat surfaces, each of said arcuate surfaces being separated from another arcuate surface by a substantially flat surface, the plane of said substantially flat surfaces is substantially perpendicular to the plane of said reflective surface, each substantially arcuate surface has an inferior radius in the range of 2μm to ½ the thickness of said reflective sign apparatus,
    wherein said light from said light source passes through said biased lens means, is reflected off said reflective surface, and passes back through said biased lens means in the approximate direction of said light source.

16. The apparatus of claim 15 wherein said reflective surface comprises corner cubic reflectors said corner cubic reflectors are arranged n rows and said biased lenticular lens mean is arranged so that each corner cubic reflector reflects light from one or more arcuate surface.

17. A reflective sign apparatus for reflecting light from a light source, said apparatus comprising:
    a reflective surface;
    a biased lens means located adjacent said reflective surface; and
    a silicone coating on the back surface of said reflective surface opposite from said biased lens means,
    wherein said light from said light source passes through said biased lens means, is reflected off said reflective surface, and passes back through said biased lens means in the approximate direction of said light source.

18. A reflective sign apparatus for reflecting light from a light source, said apparatus comprising:
    a reflective surface; and
    a biased lens means located adjacent said reflective surface, said biased lenticular lens means including a plurality of substantially arcuate surfaces and a plurality of substantially flat surfaces, each of said arcuate surfaces being separated from anther accurate surface by a substantially flat surface, the plane of said substantially flat surfaces is substantially perpendicular to the plane of said reflective surface,
    wherein said light from said light source passes through said biased lens means, is reflected off said reflective surface, and passes back through said biased lens mean in the approximate direction of said light source.

19. A reflective sing apparatus for reflecting flight form a light source, said apparatus comprising:
    a reflective surface; and,
    a biased lens means located adjacent said reflective surface, said biased lens means including a front surface having a plurality of half spherical indentations,
    wherein light from said light source passes through said biased lens means, si reflected off said reflective surface, and passes back through said biased lens mean in the approximate direction of said light source.

20. A reflective sign apparatus for reflecting light form a light source, said apparatus comprising:

a reflective surface; and, a biased lens means located adjacent said reflective surface, said biased lens means having a plurality of quarter cylindrical indentations, wherein light from said light source passes through said biased lens means, is reflected off said reflective surface, and passes back through said biased lens mean in the approximate direction of said light source.

21. A reflective sign apparatus for reflecting light form a light source, said apparatus comprising:

a reflective surface; and, a biased lens means located adjacent said reflective surface, said biased lens means including a plurality of half cylindrical indentations, wherein light form said light source passes through said biased lens means, is reflected off said reflective surface, and passes back through said biased lens means in the approximate direction of said light source.

22. A reflective sign apparatus for reflecting light form a light source, said apparatus comprising:

a reflective surface; and, a biased lens means located adjacent said reflective surface, including a front surface having a plurality of quarter cylindrical indentations, wherein light form said light source passes through said biased lens means, is reflected off said reflective surface, and passes back through said biased lens means in the approximate direction of said light source.

* * * * *

UNITED STATES PATENT AND TRADEMARK OFFICE
CERTIFICATE OF CORRECTION

PATENT NO. : 5,237,449
DATED : August 17, 1993
INVENTOR(S) : Jordan R. Nelson and Randall E. McCoy It is certified that error appears in the above-identified patent and that said Letters Patent is hereby corrected as shown below:

Col. 3, line 6, change "sing" to --sign--.

Col. 3, line 9, change "sing" to --sign.

IN THE CLAIMS:

Col. 9, claim 10, line 3, change "pierce" to --piece--

Col. 10, claim 19, line 1, change "sing" to --sign--

Col. 10, claim 19, line 9, change "si" to --is--

Signed and Sealed this

First Day of March, 1994

BRUCE LEHMAN

Attest:

Attesting Officer

Commissioner of Patents and Trademarks